(12) United States Patent
Calkins

(10) Patent No.: US 8,570,276 B2
(45) Date of Patent: Oct. 29, 2013

(54) AUGMENTED COMPUTER KEYBOARD

(76) Inventor: Donald W. Calkins, Whittier, CA (US)

( * ) Notice: Subject to any disclaimer, the term of this patent is extended or adjusted under 35 U.S.C. 154(b) by 1055 days.

(21) Appl. No.: 12/263,914

(22) Filed: Nov. 3, 2008

(65) Prior Publication Data

US 2009/0060619 A1 Mar. 5, 2009

Related U.S. Application Data

(63) Continuation-in-part of application No. 11/069,689, filed on Feb. 28, 2005, now abandoned.

(51) Int. Cl.
G06F 3/02 (2006.01)
(52) U.S. Cl.
USPC .......................... 345/168; 345/156; 345/169
(58) Field of Classification Search
USPC ................................ 361/679.1; 345/168–172
See application file for complete search history.

(56) References Cited

U.S. PATENT DOCUMENTS

| | | | |
|---|---|---|---|
| 4,564,751 A * | 1/1986 | Alley et al. | 235/146 |
| 4,949,080 A | 8/1990 | Mikan | |
| 5,268,765 A | 12/1993 | Yamashita | |
| 5,426,449 A | 6/1995 | Danziger | |
| 5,528,523 A | 6/1996 | Yoshida | |
| 5,825,612 A * | 10/1998 | Aubuchon et al. | 361/679.08 |
| 5,865,546 A | 2/1999 | Ganthier | |
| 6,018,334 A | 1/2000 | Eckerberg et al. | |
| 6,081,207 A | 6/2000 | Batio | |
| 6,084,576 A | 7/2000 | Leu | |
| 6,104,604 A | 8/2000 | Anderson | |
| 6,118,432 A | 9/2000 | Kotorov | |
| 6,385,037 B2 * | 5/2002 | Howell et al. | 361/679.55 |
| 6,407,914 B1 | 6/2002 | Helot | |
| 6,587,094 B2 | 7/2003 | Anderson | |
| 6,786,823 B2 * | 9/2004 | Huang et al. | 463/37 |
| 6,986,614 B2 * | 1/2006 | McLoone | 400/472 |
| 7,199,792 B2 | 4/2007 | Wang | |
| 7,338,224 B2 | 3/2008 | Jones | |
| 2002/0021285 A1 * | 2/2002 | Leman | 345/168 |
| 2002/0190955 A1 | 12/2002 | Chen | |

* cited by examiner

Primary Examiner — Sumati Lefkowitz
Assistant Examiner — Jesus Hernandez
(74) Attorney, Agent, or Firm — Kenneth L. Green

(57) ABSTRACT

A computer keyboard with palm support surfaces, and controls providing mouse functions, added to each side of the keyboard. The palm support surfaces are downward sloping, and/or downward curved convex surfaces, on either side of the keyboard, descending from peaks near each top rear corner of the keyboard, laterally away from the keyboard, and towards the front of the keyboard. Outside edges of the palm support surfaces may narrow and curve inward toward the front of the keyboard to allow a more natural hand position. The controls include selection buttons, normally located on a mouse, to the left of the keyboard, and a positioning device normally located on a mouse, to the right of the keyboard, and are generally embedded to the rear of each palm support surface. The controls and palm support surfaces allow a more natural hand placement and avoid pressure on the carpal tunnel area.

18 Claims, 9 Drawing Sheets

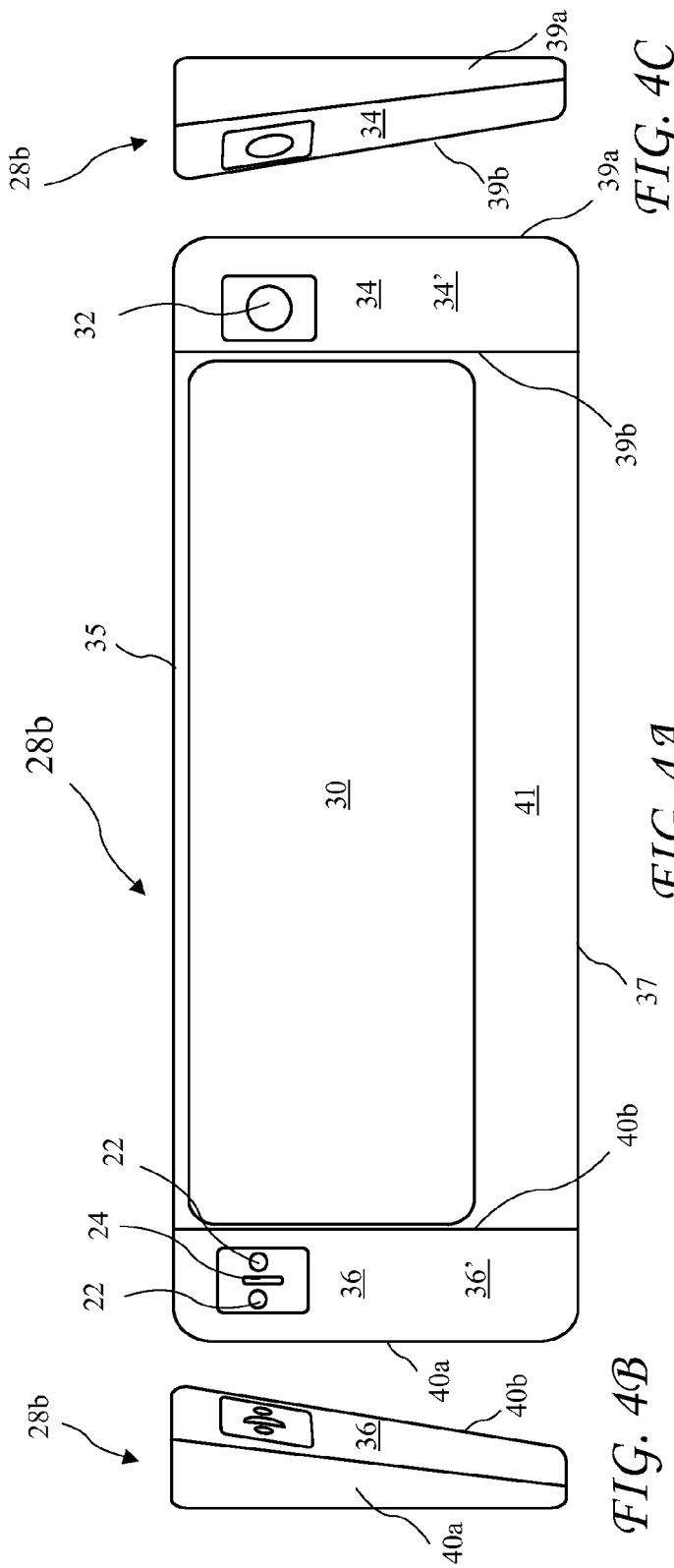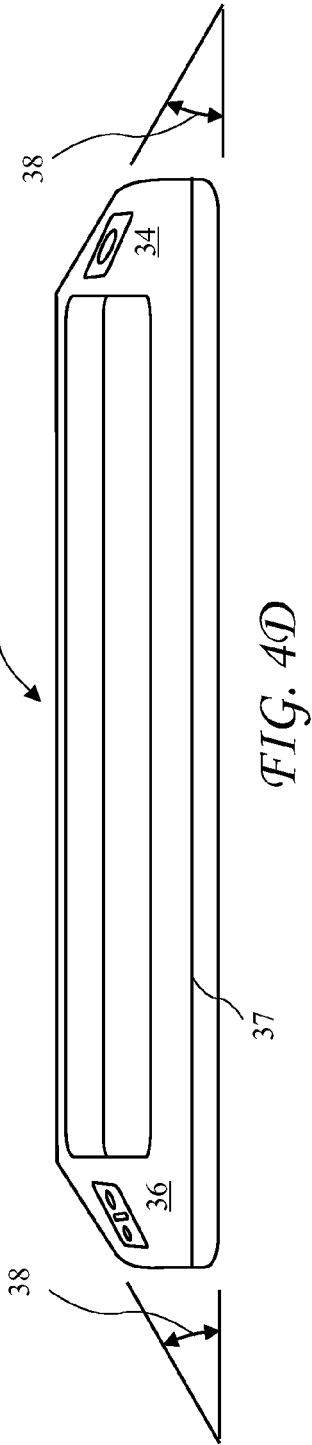

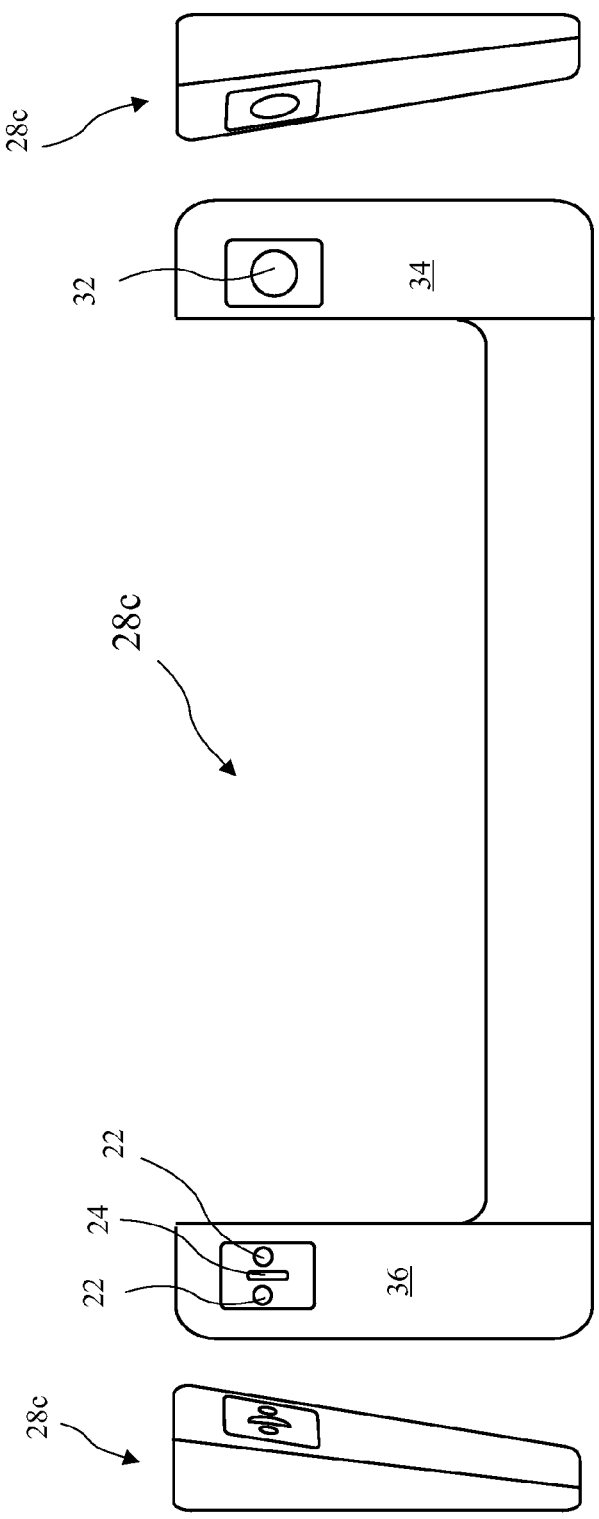

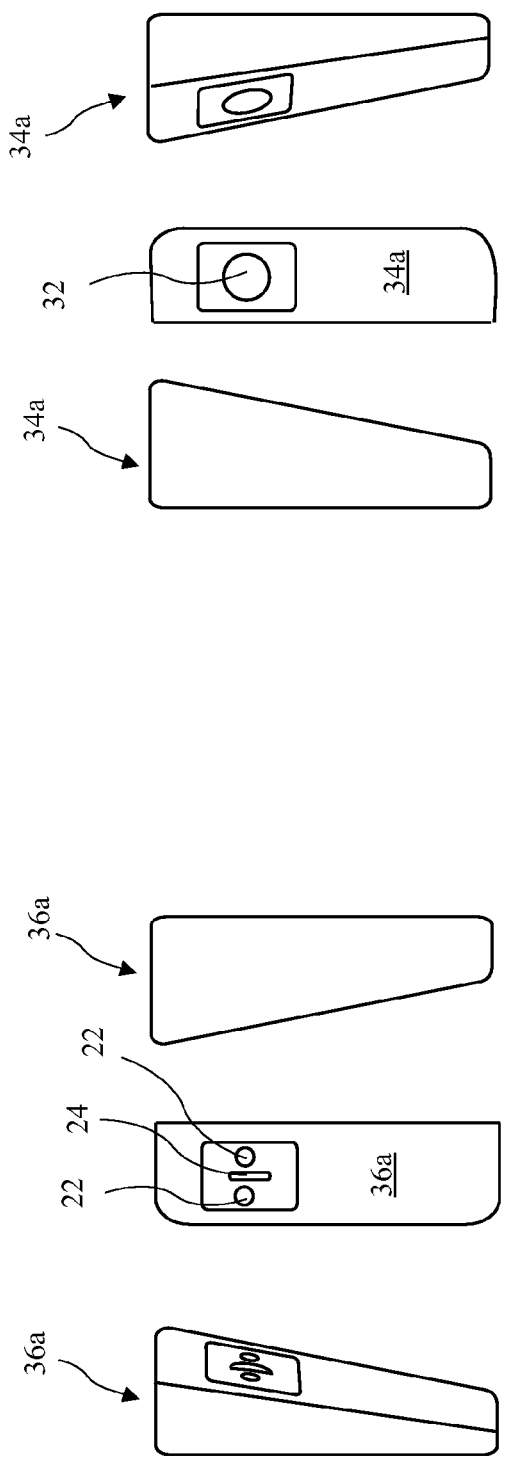
FIG. 7A   FIG. 7C
FIG. 7B   FIG. 7D
FIG. 6A   FIG. 6C
FIG. 6B   FIG. 6D

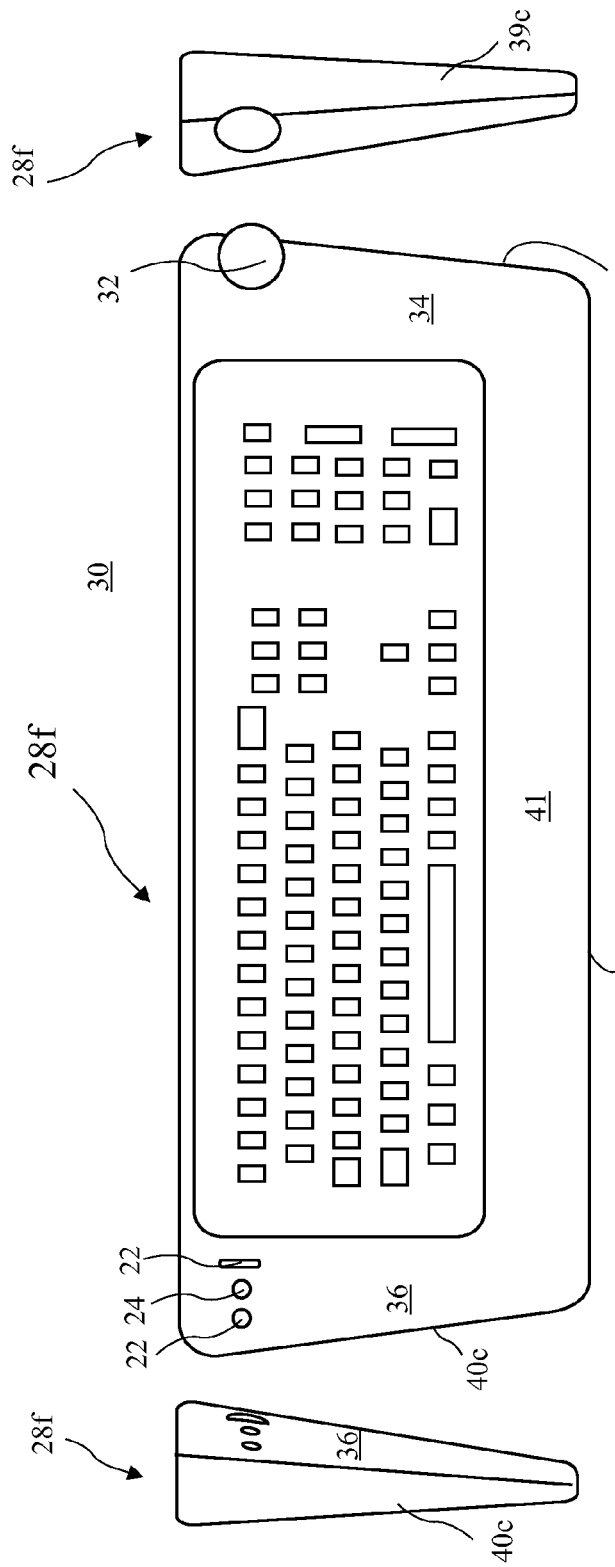
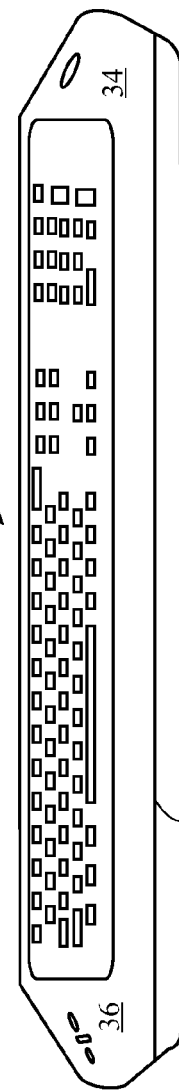
FIG. 12A
FIG. 12B
FIG. 12C
FIG. 12D

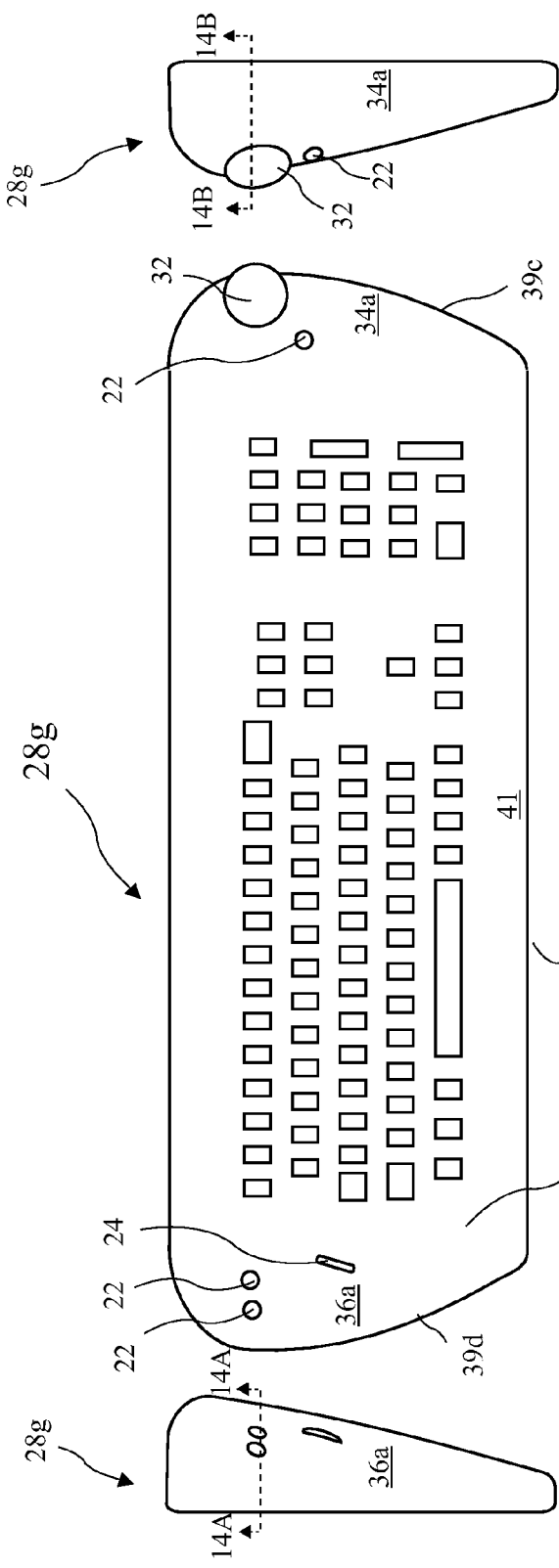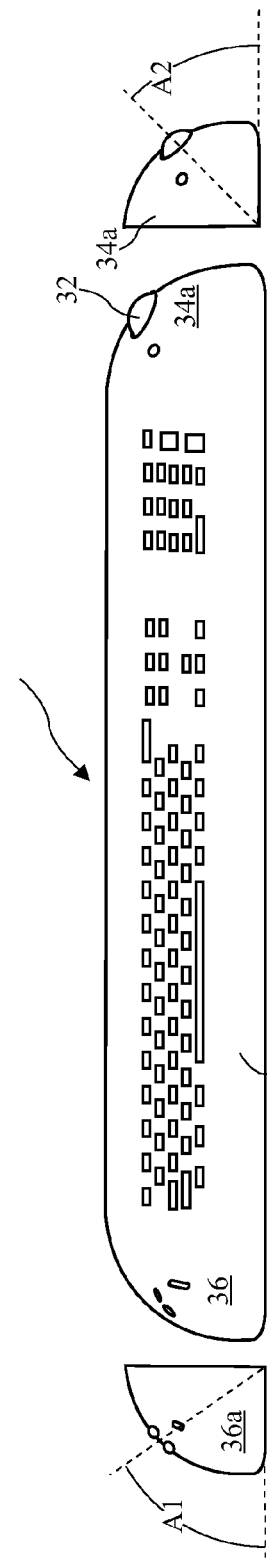

AUGMENTED COMPUTER KEYBOARD

The present application is a Continuation In Part of U.S. patent application Ser. No. 11/069,689 filed Feb. 28, 2005, which application is incorporated in its entirety herein by reference.

BACKGROUND OF THE INVENTION

Aspects of the invention described in the present application are described in Disclosure Document No. 538798 titled "Integrated Computer Input Device," received by the United States Patent and Trademark Office on Sep. 22, 2003.

The present invention relates to computer keyboards and in particular to an improved keyboard which reallocates mouse functions to the sides of the keyboard and provides palm support to reduce the occurrence of carpal tunnel injury.

Modern society has replaced many of the physically demanding and often dangerous tasks common in the past, with relatively safe and much less physically demanding office jobs. While many serious injuries and possibly fatalities are now avoided, certain tasks associated with office jobs have resulted in a new types of injury, for example, repetitive motion injuries and repetitive strain injuries.

A common form of repetitive strain injury is Carpal Tunnel Syndrome (CTS). CTS is a condition affecting the median nerve of the wrist. The median nerve passes through the carpal tunnel and CTS results from the median nerve being compressed within the carpal tunnel. Such compression of the median nerve may result in pain, numbness, and/or tingling in the fingers, hand, or wrist. The median nerve provides most of the feeling to the hand and in particular to the thumb, the index finger, the middle fingers, the thumb half of the palm, and the outer side of the hand.

CTS results in more than 2 million visits to physician's offices each year and is one of the most common job related injuries. Over one quarter of a million carpal tunnel surgeries are performed each year in the United States, and 47% of the surgeries are considered to be work-related. The Bureau of Labor Statistics found that in 1994, CTS accounted for 1.7% of workplace related injuries causing work loss. Nearly half of the CTS cases result in 31 days or more work loss, and if not treated properly, CTS may cause irreversible nerve damage and permanent disability.

Although disagreement exists as to the cause of CTS, some physicians believe that an unnatural bending and prolonged over use of the wrist inflames a protective layer over tendons in the wrist. The protective layer, called the synovial sheath, may swell and thereby place pressure on the median nerve in the carpal tunnel. The long-term use of a computer is an often cited example of such unnatural bending and prolonged over use of the wrist. Specifically, repetitive use of a computer mouse may result in asymmetrical tension across the upper back (e.g., the trapezium major and minor rhomboids, latissimus dorsi, etc.) caused by repeated movement of the shoulder and the arm controlling the mouse and by the position of the user's wrists while using the mouse.

BRIEF SUMMARY OF THE INVENTION

The present invention addresses the above and other needs by providing a computer keyboard with palm support surfaces, and controls providing mouse functions, added to each side of the keyboard. The palm support surfaces are downward sloping and/or downward curved convex surfaces on either side of the keyboard, descending from peaks near each top rear corner of the keyboard, laterally away from the keyboard, and towards the front of the keyboard (i.e., towards the user). Outside edges of the palm support surfaces may narrow and curve inward toward the front of the keyboard to allow a more natural hand position. The controls include selection buttons, normally located on a mouse, to the left of the keyboard, and a positioning device normally located on a mouse, to the right of the keyboard, and are generally embedded to the rear of the palm support surfaces. The controls are positioned on the palm support surfaces so as to allow the user to change the operating position of the forearms, wrists and hands from the standard computer user's position of pronated palms (palms down, facing the keyboard) and wrists in extension (bent upward) to a position where the arms, wrists and hands are in neutral (wrists neither flexed nor extended) alignment and the point of contact with the work surface is changed from the carpal tunnel area to the outside edge of the palms (i.e., the side of the hand between the small singer and the wrist). The controls and palm support surfaces may be integrated into a new keyboard, provided by a keyboard dock which the keyboard rests on, a "U" shaped collar surrounding the keyboard, or provided by a separate right member and left member which may be used with a standard keyboard or laptop computer.

In accordance with one aspect of the invention, there is provided an improved keyboard comprising a Personal Computer (PC) keyboard, palm support surface on each side of the keyboard, a pointing device, and selection buttons. The pointing device preferably resides at the rear right end (but may be on the rear left for a left handed user) of the keyboard and may be a track ball, a touch sensitive area, or a joy stick. The selection buttons preferably reside at the rear left end (but may be on the rear right for a left handed user) of the keyboard and comprising a left selection button, a wheel, and right selection button and a wheel. The augmented keyboard, seen from above, is symmetrical on the left and right sides of the PC keyboard. The right palm support surface curves downward and away from the PC keyboard at the rear and curves inward from the rear of the keyboard to the front. The pointing device is embedded in the downward curving surface of the right rear of the palm support surface. The palm support surface narrows and curves inward from the rear to the front and provides a surface for the right hand palm to lean against while avoiding contact with the base of the palm and the carpal tunnel area. The left palm support surface curves downward and away from the PC keyboard at the rear and curves inward from the rear of the PC keyboard to the front. The selection device is embedded in the downward curving surface of the left rear of the palm support surface. The palm support surface narrows and curves inward from the rear to the front and provides a surface for the left hand palm to lean against while avoiding contact with the base of the palm and the carpal tunnel area. The pointing device and the selection buttons replace functions of a mouse and the controls are positioned in the palm support surfaces so as to require the user to change the position of the forearms, wrists and hands from the standard computer user's position of pronated palms (palms facing the keyboard) and wrists in extension (bent upward) to a position where the arms, wrists and hands are in neutral alignment (i.e., the forearm, wrist, and hand in a straight line) and the area of contact is changed from the carpal tunnel area to the outside edge of the palms and allow the user to go from mouse functions to keyboard by moving the arms closer together or further apart without requiring the shoulders to move backwards or forwards. To operate the controls, the user positions the arms, wrist and hands in a neutral position over the ends of the PC keyboard, supinates (rotates outward) the forearms, wrists and hands outward at approximately 45 degrees and then lowers the forearms, wrists and hands to the work surface. The forearm, wrist and hand supination brings the outside edge of the hands (the Hypothenar muscle group) into contact with the surface on which the PC keyboard rests. The neutral alignment of the forearms, wrists and hands reduces the pressure on the wrists, thereby reducing repetitive strain injuries to the wrist, for example, reducing CTS.

In accordance with another aspect of the invention, there is provided an augmented keyboard comprising a PC keyboard, a right palm support surface, a left palm support surface, a pointing device residing at the rear of the right palm support surface, and selection buttons residing at the rear of the left palm support surface. The left palm support surface curves down and to the left of the keyboard and curves inward from the rear of the keyboard to the front. The selection device is positioned in the downward curving surface near the rear of the palm support, the user rotates the left forearm, wrist and hand until the palm of the hand is perpendicular to the plane of the keyboard and places the hand parallel to the outside left edge of the left palm support. The left hand is then rotated inward until at least one finger rest on one of the selection buttons and the palm of the hand comes to rest against the downward curved augmentation surface. The right palm support surface curves down and to the right of the PC keyboard and curves inward from the rear to the front. The pointing device is positioned in the downward curving surface at the rear of the right palm support surface. To position the right hand to control the selection device, the user rotates the right forearm, wrist and hand until the palm of the right hand is perpendicular to the plane of the keyboard and places the hand parallel to the right edge of the right palm support surface. The right hand is then rotated inward until at least one finger rests on the pointing device and the palm of the hand comes to rest against the downward sloping augmentation surface.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4A is a top view of a second embodiment of the keyboard augmentation according to the present invention.

FIG. 4B is a left side view of the second embodiment of the keyboard augmentation according to the present invention.

FIG. 4C is a right side view of the second embodiment of the keyboard augmentation according to the present invention.

FIG. 4D is a front view of the second embodiment of the keyboard augmentation according to the present invention.

FIG. 5A is a top view of a third embodiment of the keyboard augmentation according to the present invention.

FIG. 5B is a left side view of the third embodiment of the keyboard augmentation according to the present invention.

FIG. 5C is a right side view of the third embodiment of the keyboard augmentation according to the present invention.

FIG. 5D is a front view of the third embodiment of the keyboard augmentation according to the present invention.

FIG. 6A is a top view of a left augmenting member of a fifth embodiment of the keyboard augmentation according to the present invention.

FIG. 6B is a left side view of the left augmenting member of the fifth embodiment of the keyboard augmentation according to the present invention.

FIG. 6C is a right side view of the left augmenting member of the fifth embodiment of the keyboard augmentation according to the present invention.

FIG. 6D is a front view of the left augmenting member of the fifth embodiment of the keyboard augmentation according to the present invention.

FIG. 7A is a top view of a right augmenting member of the fifth embodiment of the keyboard augmentation according to the present invention.

FIG. 7B is a left side view of the right augmenting member of the fifth embodiment of the keyboard augmentation according to the present invention.

FIG. 7C is a right side view of the right augmenting member of the fifth embodiment of the keyboard augmentation according to the present invention.

FIG. 7D is a front view of the right augmenting member of the fifth embodiment of the keyboard augmentation according to the present invention.

FIG. 12A is a top view of an eighth embodiment of the keyboard augmentation according to the present invention.

FIG. 12B is a left side view of the eighth embodiment of the keyboard augmentation according to the present invention.

FIG. 12C is a right side view of the eighth embodiment of the keyboard augmentation according to the present invention.

FIG. 12D is a front view of the eighth embodiment of the keyboard augmentation according to the present invention.

FIG. 13A is a top view of a ninth embodiment of the keyboard augmentation according to the present invention.

FIG. 13B is a left side view of the ninth embodiment of the keyboard augmentation according to the present invention.

FIG. 13C is a right side view of the ninth embodiment of the keyboard augmentation according to the present invention.

FIG. 13D is a front view of the ninth embodiment of the keyboard augmentation according to the present invention.

FIG. 14A is a cross-sectional view of the left palm support and controls taken along like 14A-14A of FIG. 13B.

FIG. 14B is a cross-sectional view of the right palm support and controls taken along like 14B-14B of FIG. 13C.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
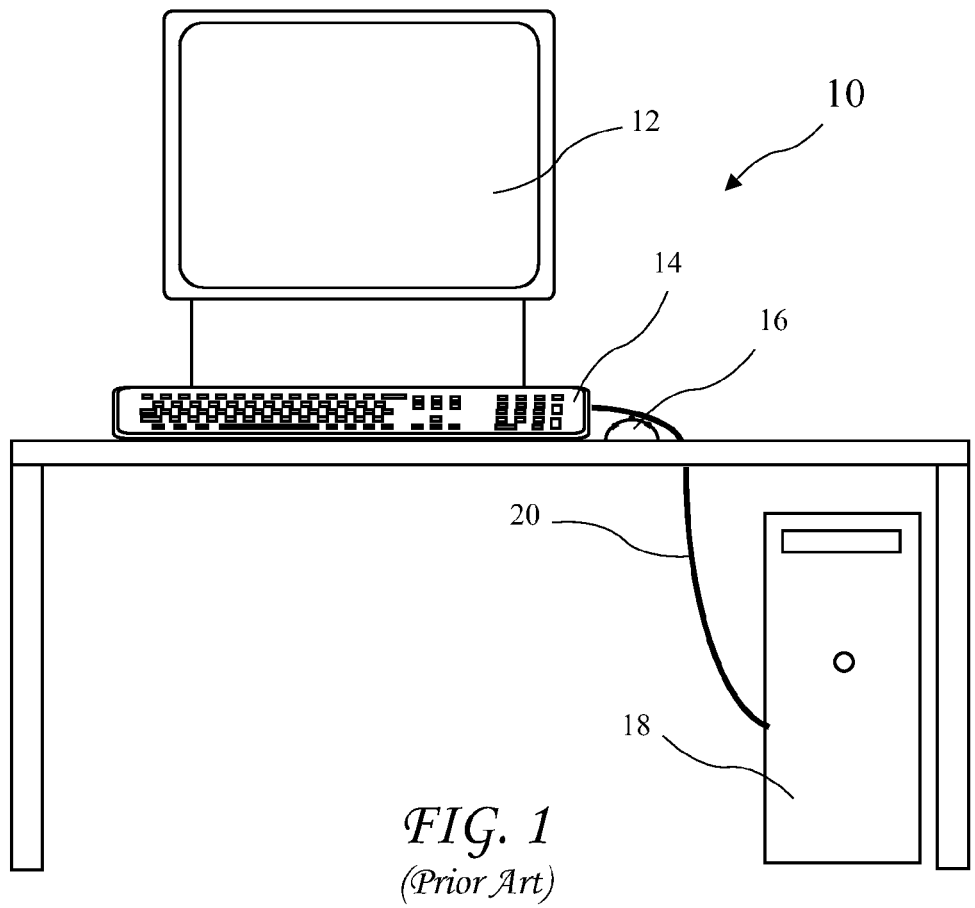
FIG. 1 is a prior art personal computer system.
Figure 2:
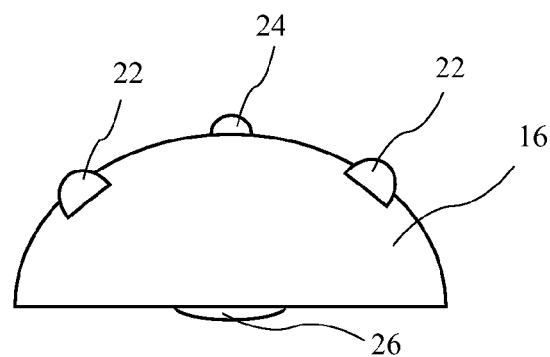
FIG. 2 is a prior art mouse use with the prior art computer system.

A prior art Personal Computer (PC) system 10 is shown in FIG. 1. The PC system 10 includes a monitor 12, a keyboard 14, a mouse 16, cables 20, and a Central Processing Unit (CPU) 18. A detailed view of the mouse 16 is shown in FIG. 2. The mouse 16 includes selection buttons 22, wheel 24, and either a ball 26 or a laser residing on the bottom of the mouse 16. Many computer application programs, for example drawing programs, rely heavily on use of the mouse 16. Often such use of the mouse 16 results in a user resting their hand, wrists in extension (flexed upward), on a desk or table surface in front of the mouse 16. Such resting of the hand may result in a light but long-term pressure on the wrist which has been identified as a possible cause of Carpal Tunnel Syndrome (CTS).

Figure 3:
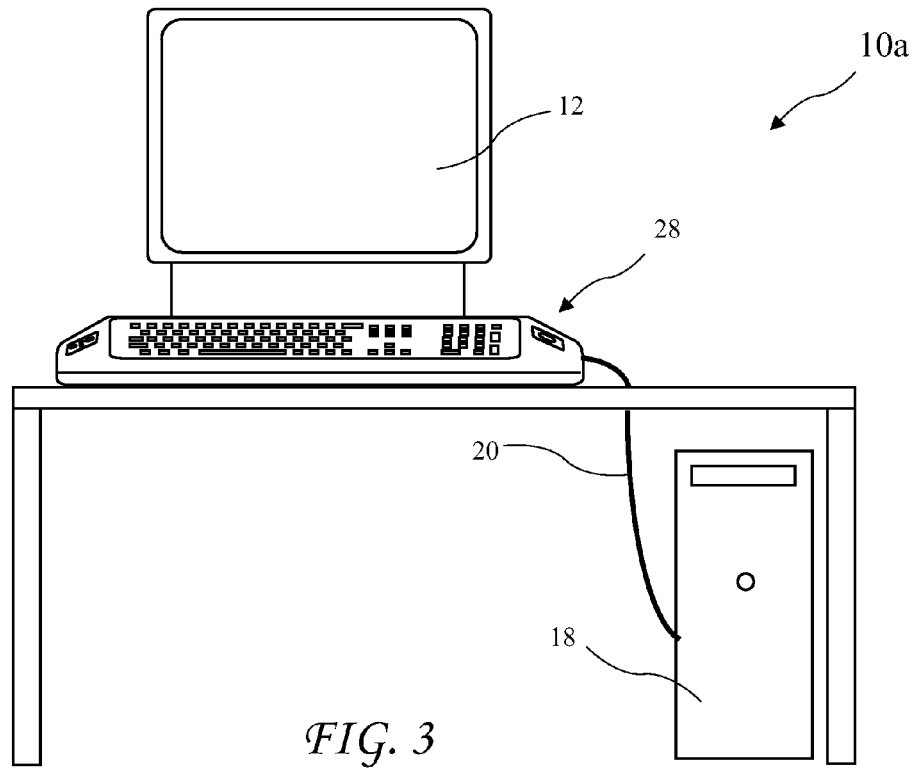
FIG. 3 is a computer system including keyboard augmentation according to the present invention.
Figure 3A:
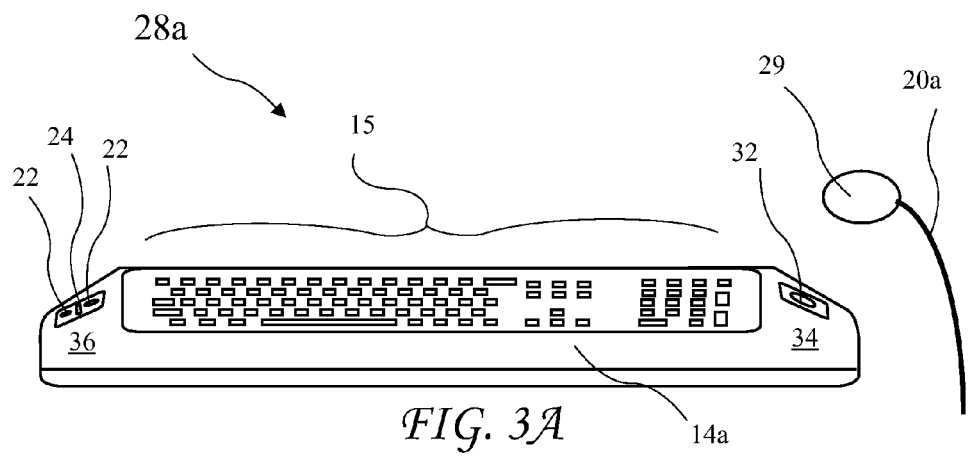
FIG. 3A is a detailed view of a first embodiment of the keyboard augmentation according to the present invention.

A PC system 10a including an augmented keyboard 28 according to the present invention is shown in FIG. 3 and a detailed view of a first embodiment of an augmented keyboard 28a is shown in FIG. 3A. The augmented keyboard 28a is an integrated keyboard including known keyboard functions and outward and downward sloping side top surfaces 34 and 36, including additional controls, on right and left sides. The augmented keyboard 28a includes keyboard keys 15, at least one selection button and preferably at least two selection buttons comprising right and left buttons 22 and a wheel 24, residing on the left side top surface 36 to the left of the keys 15, and a pointing device 32 residing on the right side top surface 34 to the right of the keys 15, all residing in a keyboard housing 14a. The selection buttons are integrated near the rear of the left side top surface 36 and are positioned along the outward and downward sloping top surface such that the user may rest the outside edge of the hand upon the work top surface to left of the side top surface 36 and then lean the left hand inward until the first two fingers of the left hand are in contact with the selection buttons and the palm of the hand is in contact with the side top surface 36. The side top surfaces 34 and 36 are flat and continuous reaching from the front edge 37 to the rear edge 35 of the keyboard (see FIG. 4A). The side top surface 34 reaches from the right edge of the keys 15 down and to the right (i.e., down and away from the keys 15) reaching from proximal to the right side edge 39a of the augmented keyboard 28a. The side top surface 36 reaches from proximal to the left edge of the keys 15 down and to the left (i.e., down and away from the keys 15) reaching to the left side edge 39a of the augmented keyboard 28a. Palm support areas 34' and 36' are defined on the side top surfaces 34 and 36 respectively, between the right and left buttons 22 and a wheel 24 and the wheel 24, and the front edge 37 of the augmented keyboard 28.

Continuing with FIGS. 3 and 3A, the pointing device is integrated into the right palm support side top surface 34 at the right rear of the keys 15 and is positioned along the downward sloping top surface of the right side top surface 34 such that the user may rest the outside edge of the hand upon the work top surface and then leans the right hand inward until the first two fingers of the left hand are in contact with the pointing device and the palm of the hand is in contact with the sloping right side top surface 34. The side top surfaces 34 and 36 are preferably top surface portions of the keyboard housing 14a. The augmented keyboard 28a may be connected to the CPU 18 by standard cables 20 (see FIG. 3) or a receiver 29 may be connected to the CPU 18 by a second cable 20a, and the augmented keyboard 28a may wirelessly communicate with the receiver 29. Alternatively, a receiver may be built into the CPU 18 to provide a wireless connection between the augmented keyboard 28a and the CPU 18.

A second embodiment of an augmented keyboard 28b comprising an augmentation dock is shown in top view FIG. 4A, in left side view in FIG. 4B, in right side view in FIG. 4C, and in front view in FIG. 4D. The augmented keyboard 28b includes a keyboard cavity 30, wherein a standard keyboard 14 (see FIG. 1) may reside. The side top surfaces 34 and 36 curve down and away from the keyboard at an angle 38. The side top surfaces 34 and 36 provide support for the inside of the user's palms which rest edge-wise on the work top surface and lean into the augmentation top surfaces when the user rotates the forearms inward. The angle 38 is preferably between 25 degrees and 60 degrees, and more preferably between 30 degrees and 45 degrees, and most preferably approximately 35 degrees. Right outside and inside edges 39a and 39b and left outside and inside edges 40a and 40b (see FIG. 4A) between a center portion 41 of the keyboard augmentation 28b and the side top surfaces 34 and 36, along right and left sides of the augmented keyboard 28b, and along a front edge of the keyboard augmentation 28b are preferably rounded edges. More preferably, all edges which a user's hands, palms, wrists, or forearms come in contact with during use of the keyboard, are rounded, and more preferably rounded and/or cushioned. The outside edges 39a and 40a are preferably parallel to the inside edges 39b and 40b, and/or the outside edges 39a and 40a are preferably perpendicular to the front edge 37.

A third embodiment of an augmented keyboard 28c is shown in top view in FIG. 5A, in left side view in FIG. 5B, in right side view in FIG. 5C, and in front view in FIG. 5D. The augmented keyboard 28c comprises a "U" shaped collar and fits around a base and sides of the keyboard 14 (see FIG. 1).

A fourth embodiment of the augmented keyboard comprises a left palm support member 28d and a right palm support member 28e. The left palm support member 28d is shown in top view in FIG. 6A, in left side view in FIG. 6B, in right side view in FIG. 6C, and in front view in FIG. 6D. The right palm support member 28e is shown in top view in FIG. 7A, in left side view in FIG. 7B, in right side view in FIG. 7C, and in front view in FIG. 7D. The left palm support member 28d is adapted to reside on the left side of a keyboard or a laptop computer, and the right palm support member 28e is adapted to reside on the right side of the keyboard or laptop computer.

Figure 8:
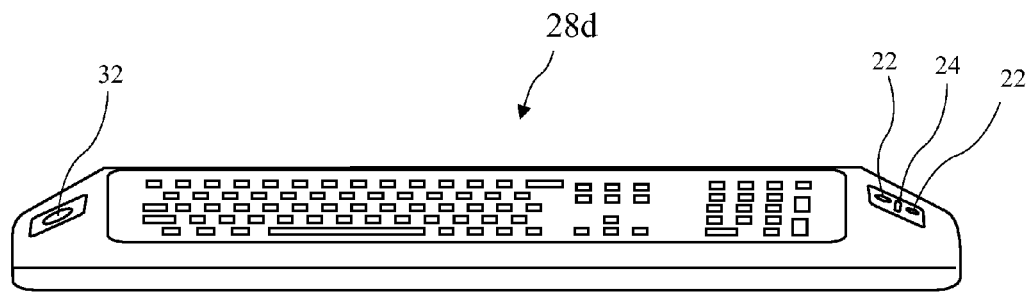
FIG. 8 is a sixth embodiment of the keyboard augmentation of the present invention adapted for left-handed use.

A fifth augmented keyboard 28f adapted for left-hand users is shown in FIG. 8. In the case of the augmented keyboard 28f, the pointing device 32 is positioned at the left end of the keyword, and the selection buttons 22 and the wheel 24 are positioned on the right side of the keyboard.

Figure 9A:
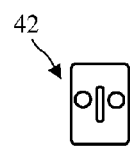
FIG. 9A is a button module according to the present invention.
Figure 9B:
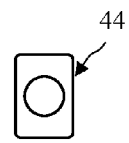
FIG. 9B is a pointing device module according to the present invention.
Figure 10:
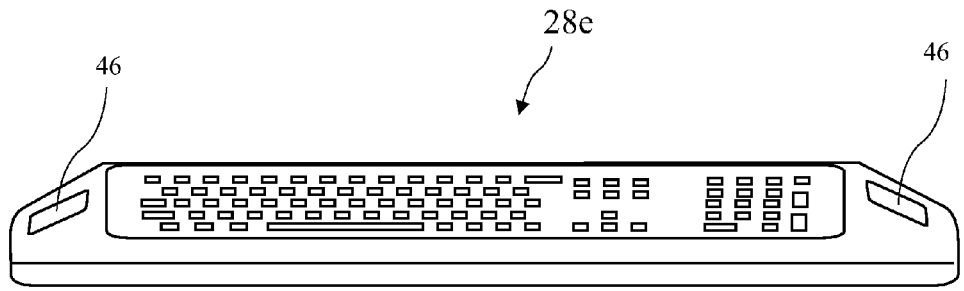
FIG. 10 is a seventh embodiment of a keyboard augmentation including module ports according to the present invention.

A button module 42 is shown in FIG. 9A and a pointing module 44 is shown in FIG. 9B. The modules 42 and 44 are adapted to be removably insertable into module ports 46 in a sixth keyboard augmentation 28g shown in FIG. 10. The modules 42 and 44 share a common interface, and thus may be interchangeably inserted into ports 46 on the right and left side of the augmentation 20g. For example, the modules 42 and 44 may have electrical plugs which cooperate with mating plugs in the ports 46, or the modules 42 and 44 may have fixed wiring which remains attached when the modules 42 are 44 are switched between the ports 46, or the modules 42 and 44 may be wirelessly connected. Thus, the keyboard augmentation 28g may be adapted for a right handed user or a left handed user.

Figure 11A:
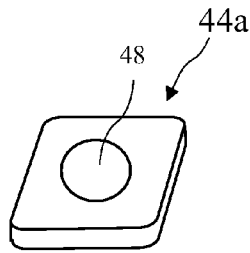
FIG. 11A is a pointing device comprising a track ball according to the present invention.
Figure 11B:
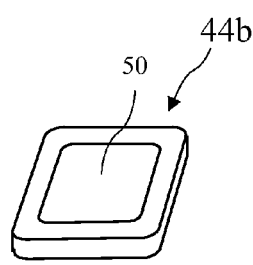
FIG. 11B is a pointing device comprising a touch sensitive pad according to the present invention.
Figure 11C:
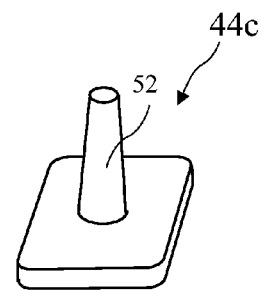
FIG. 11C is a pointing device comprising a joystick according to the present invention.

A pointing device 32 comprising a trackball 48 is shown in FIG. 11A, a pointing device 32 comprising a touchpad 50 is shown in FIG. 11B, and a pointing device 32 comprising a joystick 52 is shown in FIG. 11C. Other pointing devices are known, and a keyboard augmentation according to the present invention including any pointing device positioned as described herein is intended to come within the scope of the present invention.

An eighth embodiment of an augmented keyboard 28f is shown in top view in FIG. 12A, in left side view in FIG. 12B, in right side view in FIG. 12C, and in front view in FIG. 12D. The augmented keyboard 28f is similar to the augmented keyboard 28a (see FIG. 3A) except that outside edges 39c and 40c are angled in (I. e., narrowed) towards the front of the augmented keyboard 28f).

A ninth embodiment of an augmented keyboard 28g is shown in top view in FIG. 13A, in left side view in FIG. 13B, in right side view in FIG. 13C, and in front view in FIG. 13D. The augmented keyboard 28g is similar to the augmented keyboard 28a (see FIG. 3A) except that outside edges 39d and angled in (i. e., narrowed) towards the front of the augmented keyboard 38f).

A cross-sectional view of the left side top surface 36a and controls taken along like 14A-14A of FIG. 13B is shown in FIG. 14A and cross-sectional view of the right side top surface 34a and controls taken along like 14B-14B of FIG. 13C is shown in FIG. 14B. The controls 22 and 24 are preferably angularly spaced above the work top surface by angle A1, which is preferably between about 25 degrees and about 60 degrees. The pointing device 32 is preferably angularly spaced above the work top surface by angle A2, which is preferably between about 25 degrees and about 60 degrees. The cross-sections of the side top surfaces 34a and 36a are approximately a quarter circle shape, and as the taper smaller towards the front of the keyboard, the side top surfaces 34a and 36a form top surfaces with substantially quarter cone shapes (i.e., the top surfaces resembling a longitudinal quarter section of a generally frusticonical shape tapering monotonically smaller from proximal to the rear of the keyboard towards the front of the keyboard and may have some curvature, but overall have the shape is of a quarter of a cone). An additional control 22 may be positioned on the right side top surface 34a to allow single hand use.

Figure 15:
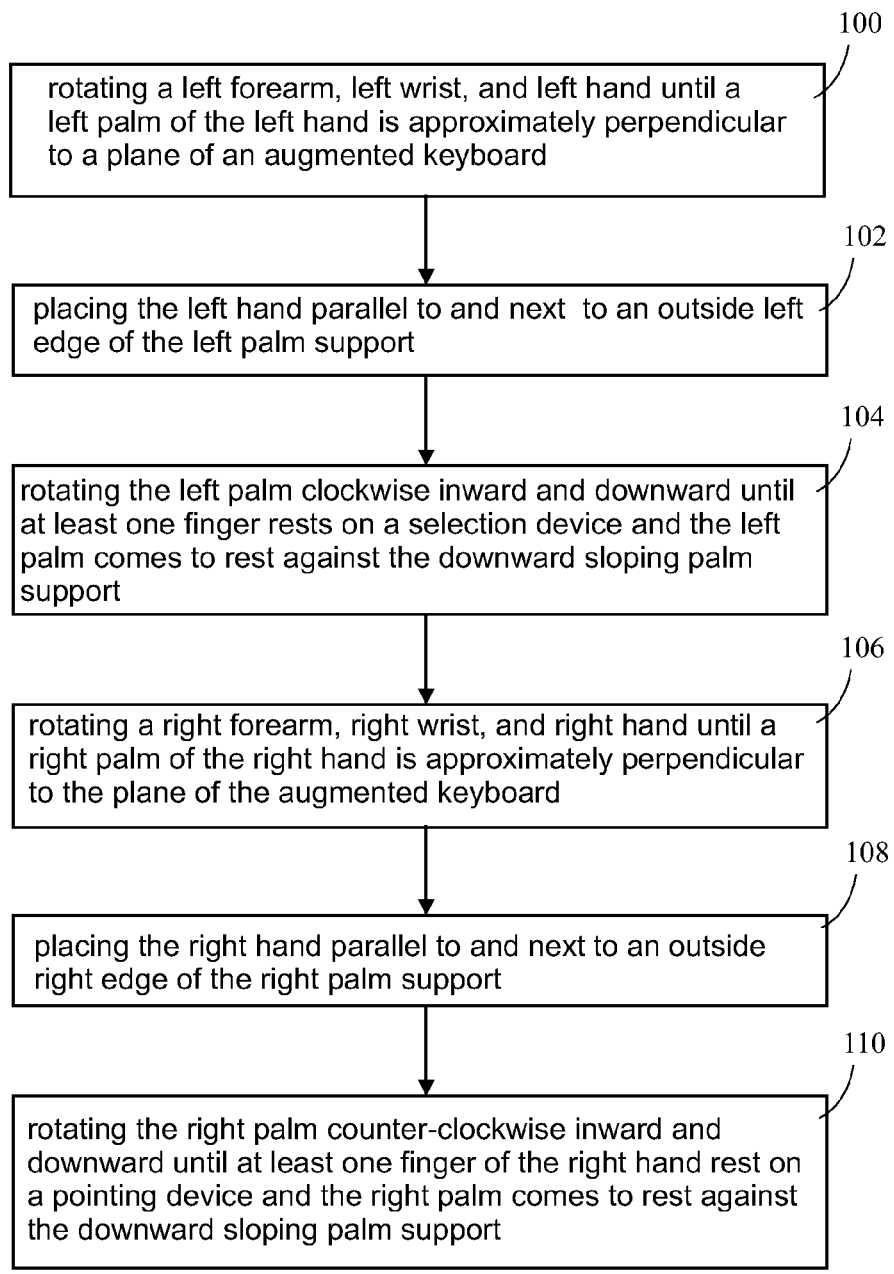
FIG. 15 is a method for using left and right palm supports according to the present invention.

A method according to the present invention for using the left and right palm supports is described in FIG. 15. The method includes rotating a left forearm, left wrist, and left hand until a left palm of the left hand is approximately perpendicular to a plane of an augmented keyboard having a left palm support surface curving down and to the left and curving inward to narrow from the rear of the keyboard to the front, the left palm support surface having selection buttons residing at the rear of the left palm support surface at step 100, placing the left hand parallel to and next to an outside left edge of the left palm support at step 102, rotating the left hand clockwise inward and downward until the left palm comes to rest against the downward sloping palm support at step 104, rotating a right forearm, right wrist, and right hand until a right palm of the right hand is approximately perpendicular to the plane of the augmented keyboard having a right palm support surface curving down and to the right and curving inward to narrow from the rear of the keyboard to the front, the right palm support surface having a pointing device residing at the rear of the right palm support surface at step 106, placing the right hand parallel to and next to an outside right edge of the right palm support at step 108 and rotating the right hand counter-clockwise inward and downward until right palm comes to rest against the downward sloping palm support at step 110. The method may further include rotating the left palm clockwise inward and downward until at least one finger of the left hand rests on the selection device and/or rotating the right palm counter-clockwise inward and downward until at least one finger of the right hand rests on the pointing device.

While the invention herein disclosed has been described by means of specific embodiments and applications thereof, numerous modifications and variations could be made thereto by those skilled in the art without departing from the scope of the invention set forth in the claims.

I claim:

1. A keyboard augmentation comprising:
a Personal Computer (PC) keyboard having keys, a front edge, a rear edge, a right side edge, and a left side edge;
right and left side top surfaces of the keyboard, the side top surfaces flat and continuous, reaching from the front edge of the keyboard to the rear edge of the keyboard;
the right side top surface reaching from proximal to the right edge of the keys, down and to the right, reaching to the right side edge of the keyboard; and
the left side top surface reaching from proximal to the left edge of the keys, down and to the left, reaching to the left side edge of the keyboard;
right and left controls comprising a pointing device and at least one selection button, the controls residing at a right rear corner of the augmented keyboard and a left rear corner of the augmented keyboard;
a right rest top surface defined on the right side top surface and in front of the right control for supporting the right hand of a user while using the right control to reduce pressure on the right wrist which may contribute to Carpal Tunnel Syndrome;
a left rest top surface defined on the left side top surface and in front of the left control and angled down to the left for supporting the left hand of the user while using the left control to reduce pressure on the left wrist which may contribute to Carpal Tunnel Syndrome; and
wherein the controls provide functions of a mouse.

2. The keyboard augmentation of claim 1, wherein the right side top surface is angled down and to the right at between 25 degrees and 60 degrees below the horizontal and the left side top surface is angled down and to the left at between 25 degrees and 60 degrees below the horizontal.

3. The keyboard augmentation of claim 2, wherein the right side top surface is angled down and to the right at between 30 degrees and 45 degrees below the horizontal and the left side top surface is angled down and to the left at between 30 degrees and 45 degrees below the horizontal.

4. The keyboard augmentation of claim 3, wherein the right side top surface is angled down and to the right at approximately 35 degrees below the horizontal and the left side is angled down and to the left at approximately 35 degrees below the horizontal.

5. The keyboard augmentation of claim 1, further comprising an augmentation dock, wherein:
the augmentation dock includes a cavity adapted to carry the keyboard;
the controls reside to the right and left of the cavity in the augmentation dock; and
the right rest top surface, and the left rest top surface reside to the right and left of the cavity.

6. The keyboard augmentation of claim 1, further comprising an augmentation collar wherein:

the augmentation collar is "U" shaped and fits around a base and sides of the keyboard; and the right rest top surface, the left rest top surface, the pointing device and the at least one selection button reside on the augmentation collar.

7. The keyboard augmentation of claim 1, further comprising right and left augmentation members adapted to reside to the right and left of the keyboard respectively, wherein:

the controls reside on the augmentation members;

the right rest top surface resides on the right augmentation member; and the left rest top surface reside on the left augmentation member.

8. The keyboard augmentation of claim 1, further including module ports on the left and right sides of the keyboard, wherein:

the at least one selection button resides on a button module;

the pointing device resides on a pointing device module; and the button module and the pointing device modules are insertable into either module port.

9. The keyboard augmentation of claim 1, wherein the side edges are flat and fixed side edges.

10. The keyboard augmentation of claim 1, wherein the side have parallel side edges.

11. The keyboard augmentation of claim 1, wherein the side reside entirely to the right and left sides of the keys.

12. The keyboard augmentation of claim 1, wherein the right and left side top surfaces angle in to the front of the augmented keyboard.

13. The keyboard augmentation of claim 1, wherein:

the and left side top surfaces are below an upper top surface of the augmented keyboard; and the right and left side top surfaces are flat and fixed and have parallel outside and inside edges.

14. An augmented keyboard comprising:

a Personal Computer (PC) keyboard having:

keys;

a front edge towards a user; and a rear edge away from a user a right side edge; and a left side edge;

controls comprising:

a pointing device selected from a group consisting of a track ball, a touch sensitive area, and a joy stick and residing at a first rear corner of the augmented keyboard; and selection buttons comprising a left selection button, a wheel, and right selection button and residing at a second rear corner opposite the first rear corner of the augmented keyboard;

right and left side top surfaces of the keyboard, the side top surfaces resembling a longitudinal quarter section of a generally frusticonical shape tapering monotonically smaller from proximal to the rear of the augmented keyboard towards the front of the keyboard and continuous reaching from the front edge of the keyboard to the rear edge of the keyboard:

the right side top surface reaching from proximal to the right edge of the keys, down and to the right, reaching to the right side edge of the keyboard; and the left side top surface reaching from proximal to the left edge of the keys down and to the left, reaching to the left side edge of the keyboard, a right rest top surface defined on the right side top surface and residing to the right of a rightmost of the keys, the right rest top surface curving outward to the right and then downward and the right rest top surface tapering narrower towards the front edge of the augmented keyboard, a right cross-section of the right rest top surface being a quarter circle shape, and as the right rest top surface tapers narrower towards the front edge of the keyboard, the right rest top surface forms a quarter cone shape; and a left rest top surface defined on the left side top surface and residing to the left of a leftmost of the keys, the left rest top surface curving outward to the left and then downward and the left rest top surface tapering narrower towards the front edge of the augmented keyboard, a left cross-section of the left rest top surface being a quarter circle shape, and as the left rest top surface tapers narrower towards the front edge of the keyboard, the left rest top surface forms a quarter cone shape;

wherein:

the right support is for supporting the right hand of the user by supporting an inside portion of the right of the right hand when the right hand is positioned to control the controls residing at the right rear corner of the augmented keyboard;

the left support is for supporting the left hand of the user by supporting an inside portion of the left of the left hand when the left hand is positioned to control the controls residing at the left rear corner of the augmented keyboard; and the pointing device and the selection buttons replace functions of a mouse.

15. The keyboard augmentation of claim 1, wherein the side top surfaces extend down and away from the keys.

16. The keyboard augmentation of claim 15, wherein the side top surfaces extend monotonically down and away from the keys.

17. The keyboard augmentation of claim 14, wherein the side top surfaces extend down and away from the keys.

18. The keyboard augmentation of claim 17, wherein the side top surfaces extend monotonically down and away from the keys.

* * * * *